United States Patent
Hiraga et al.

(10) Patent No.: US 9,342,061 B2
(45) Date of Patent: May 17, 2016

(54) WIRE ELECTRIC DISCHARGE MACHINE CONTROLLER FOR CORRECTING MACHINING ROUTE USING PROGRAM COMMANDS

(71) Applicant: FANUC CORPORATION, Yamanashi (JP)

(72) Inventors: Kaoru Hiraga, Yamanashi (JP); Koji Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 672 days.

(21) Appl. No.: 13/726,333

(22) Filed: Dec. 24, 2012

(65) Prior Publication Data
US 2013/0238114 A1  Sep. 12, 2013

(30) Foreign Application Priority Data
Mar. 12, 2012  (JP) .................. 2012-054825

(51) Int. Cl.
| | |
|---|---|
| *G05B 13/02* | (2006.01) |
| *B23H 7/20* | (2006.01) |
| *G05B 19/19* | (2006.01) |
| *B23H 7/02* | (2006.01) |
| *B23H 7/06* | (2006.01) |

(52) U.S. Cl.
CPC ............... *G05B 13/021* (2013.01); *B23H 7/20* (2013.01); *G05B 19/19* (2013.01); *B23H 7/02* (2013.01); *B23H 7/065* (2013.01); *G05B 2219/45221* (2013.01); *G05B 2219/49164* (2013.01)

(58) Field of Classification Search
None
See application file for complete search history.

(56) References Cited

U.S. PATENT DOCUMENTS

| | | | | | |
|---|---|---|---|---|---|
| 5,021,622 | A | * | 6/1991 | Magara et al. | 219/69.12 |
| 5,041,984 | A | * | 8/1991 | Watanabe | 700/162 |
| 5,418,344 | A | * | 5/1995 | Magara et al. | 219/69.12 |
| 5,504,294 | A | * | 4/1996 | Izumiya et al. | 219/69.12 |
| 5,808,263 | A | * | 9/1998 | Beltrami | 219/69.12 |
| 6,184,485 | B1 | * | 2/2001 | Day et al. | 219/69.12 |

(Continued)

FOREIGN PATENT DOCUMENTS

| | | |
|---|---|---|
| DE | 4025164 A1 | 2/1991 |
| EP | 2133167 A2 | 12/2009 |

(Continued)

OTHER PUBLICATIONS

Yang, Lijun and Dang, Xinan, Analysis of the Corner Error in WEDM, Applied Mechanics and Materials, vols. 37-38, pp. 146-149, 2010.*

(Continued)

*Primary Examiner* — Christopher E Everett
(74) *Attorney, Agent, or Firm* — Hauptman Ham, LLP (57) ABSTRACT

A block in an electric discharge machining program is read out and analyzed, and when determined that a machining route correction command is issued to correct the machining route at a corner formed by consecutive first and second machining blocks, the machining route is corrected such that the end point of the first machining block, an extension point obtained by extending the first machining block from the end point thereof by a predetermined distance in the machining advancing direction, and a new start point obtained by partially removing the second machining block by a predetermined distance from the start point thereof are connected. Then, the wire electrode is moved with respect to the workpiece, following the corrected machining route.

1 Claim, 4 Drawing Sheets

(56) References Cited

U.S. PATENT DOCUMENTS

| | | |
|---|---|---|
| 2005/0143854 A1 | 6/2005 | Shinozaki et al. |
| 2006/0091113 A1* | 5/2006 | Hiraga et al. .............. 219/69.12 |
| 2008/0251500 A1 | 10/2008 | Hiraga et al. |

FOREIGN PATENT DOCUMENTS

| | | | |
|---|---|---|---|
| EP | 2133167 | A3 | 9/2010 |
| GB | 2 237 127 | A | 4/1991 |
| JP | 61-219529 | A | 9/1986 |
| JP | 03-073226 | A | 3/1991 |
| JP | 7-24645 | A | 1/1995 |
| JP | 7-214629 | A | 8/1995 |
| JP | 2002-312008 | A | 10/2002 |
| JP | 2005-022260 | A | 1/2005 |

OTHER PUBLICATIONS

Corresponding Japanese Application No. 2012-054825 Notification of Reasons for Refusal dated May 14, 2013.

Extended European Search Report issued Oct. 24, 2014, corresponding to European patent application No. 13150412.8.

Office Action issued May 6, 2015, corresponding to Chinese patent application No. 201310077519.5.

* cited by examiner

| UNCORRECTED | CORRECTED |
|---|---|
| O100 | O100 |
| G92X0. 0Y0. 0 | G92X0. 0Y0. 0 |
| G91G01G40X0. Y3. | G91G01G40X0. Y3. |
| G41X-5. | G41X-5. MxxA1. 0B1. 0 |
| Y10. | Y10. MxxA1. 0B1. 0 |
| X10. | X10. MxxA1. 0B1. 0 |
| Y-10. | Y-10. MxxA1. 0B1. 0 |
| X-5. | X-5. |
| M30 | M30 |

```
UNCORRECTED              CORRECTED

WIRE ELECTRIC DISCHARGE MACHINE CONTROLLER FOR CORRECTING MACHINING ROUTE USING PROGRAM COMMANDS

RELATED APPLICATIONS

The present application is based on, and claims priority from, Japanese Application Number 2012-054825, filed Mar. 12, 2012, the disclosure of which is hereby incorporated by reference herein in its entirety.

BACKGROUND OF THE INVENTION

1. Field of the Invention

The present invention relates to a wire electric discharge machine controller for correcting the machining route using program commands.

2. Description of the Related Art

Figure 5:
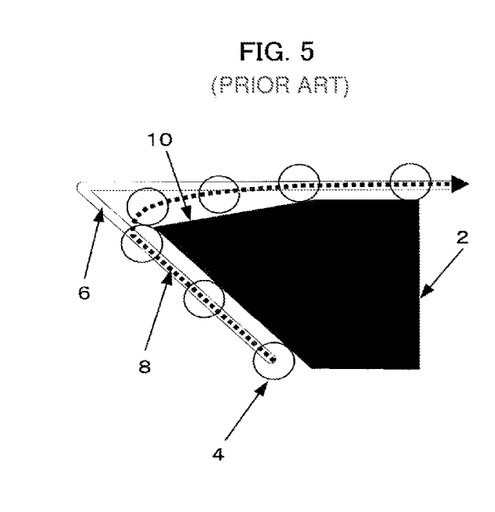
FIG. 5 illustrates how a corner is machined by a prior art technique.

In wire electric discharge machining, a problem is known that the accuracy of corner shapes of a workpiece is degraded by the deflection of a wire electrode that occurs due to the flow of machining liquid and/or a discharge repulsion force arising between the wire electrode and the workpiece. FIG. 5 shows wire electric discharge machining at a corner. Being deflected, the wire electrode 4 advances along the track 8 indicated by the dashed line inside the machining route 6 that is created on the basis of a machining program. Consequently, the workpiece 2 would be machined more than expected, resulting in degraded accuracy of the shape. Reference numeral 10 in FIG. 5 indicates the portion of the workpiece excessively machined by the deflected wire electrode.

Wire electric discharge machining methods and controllers have been designed to improve the machining accuracy by controlling the machining speed and/or energy at corners or by correcting or changing the machining route at corners. Since controlling the machining speed and/or energy to secure the shape accuracy at corners involves adverse effects such as a longer machining time, various methods have been designed to correct or change the machining route without significantly affecting the machining time.

Figure 6:
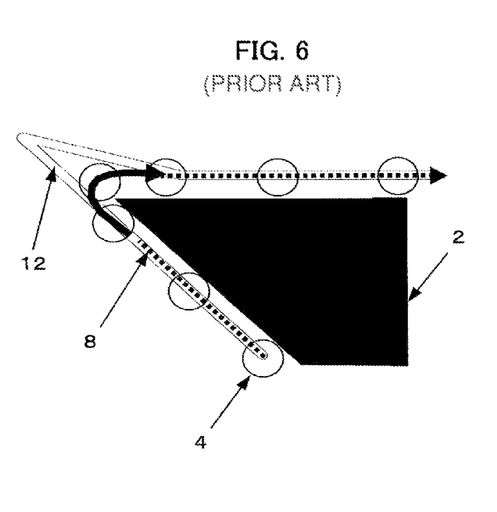
FIG. 6 illustrates how a corner is machined by changing the machining route in a prior art technique.
Figure 7:
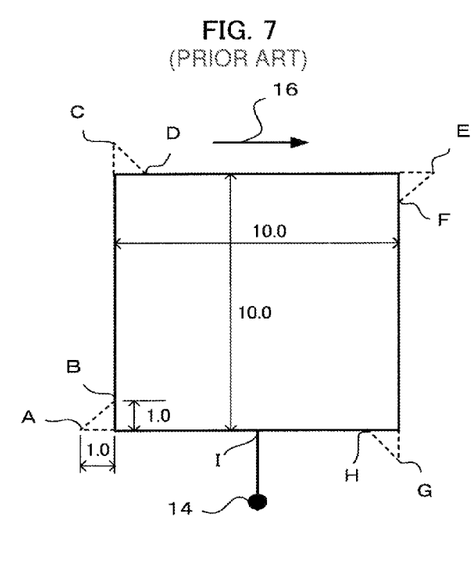
FIG. 7 illustrates an electric discharge machining method in a prior art technique.
Figure 8:
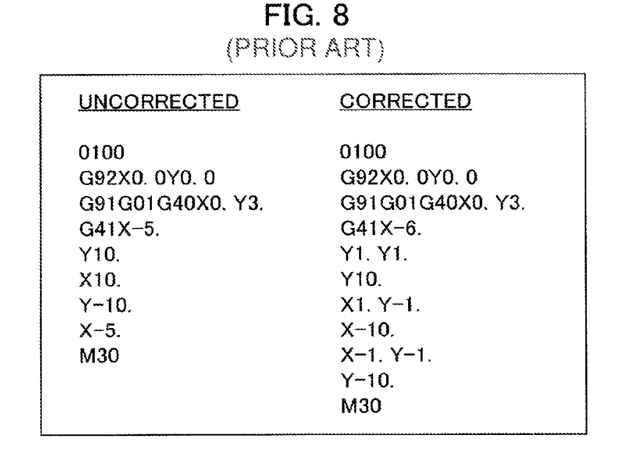
FIG. 8 illustrates an example of modification of a machining program according to a prior art technique.

Generally contemplated first would be a method that changes the machining route at corners by modifying the machining program to cause the wire electrode to advance outside the original machining route as shown in FIG. 6. Reference numeral 12 in FIG. 6 indicates the changed machining route. When machining a shape as indicated by the solid line in FIG. 7, the worker modifies the axis movement commands corresponding to the machining blocks in the machining program as shown in FIG. 8 to change the machining route at the corners as indicated by the dashed lines.

Figure 9:
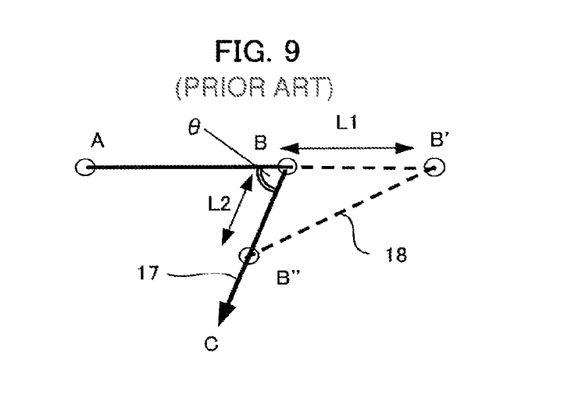
FIG. 9 illustrates modification of a machining program for machining a shape requiring simultaneous X and Y axis operations.

In such a method, the worker creates a machining route using movement commands in the machining program by taking into account the amount of deflection of the wire electrode, such that the deflection of the wire electrode does not affect the workpiece. For a simple shape as in FIG. 7, it is easy to modify the machining program as shown in FIG. 8, but not easy when the shape to be machined is complicated. Suppose modification of a machining program for machining a shape requiring simultaneous X and Y axis operations as shown in FIG. 9, for example. Assuming that the coordinates of point B are (Xb, Yb) and the coordinates of point C are (Xc, Yc), then the coordinates of point B' become (Xb+L1, Yb) and the coordinates of point B" become (Xb−L2×cos θ, Yb−L2×sin θ) and accordingly the amounts of X and Y axis movements between these points are expressed as follows:

Section BB': (L1, 0)
Section B'B": (−L1−L2×cos θ, −L2×sin θ)
Section B"C: (Xc−Xb+L2×cos θ, Yc−Yb+L2×sin θ)

It is not easy to modify the machining program such that these coordinates are passed through. Accordingly, a technique such as the following has been designed to automatically correct the machining route, eliminating the need for the worker to directly modify the machining program. This technique automatically identifies corners and their angles etc. from the machining program and automatically corrects the machining route by retrieving the amounts of correction from the parameters stored in a storage device or the like, thereby eliminating the need for the worker to modify the machining program.

Japanese Patent Application Laid-Open No. 61-219529 (hereinafter referred to as Patent Document 1) discloses a shape control system of wire electric discharge machining. This control system includes a storage unit for storing the amount of deflection of the wire electrode, a computing unit for determining the machining direction of the wire electrode by computation based on the shape to be machined, and a drive unit for driving the wire electrode after positioning it forward in the machining direction by the amount of correction that is equal to the amount of deflection.

Japanese Patent Application Laid-Open No. 7-24645 (hereinafter referred to as Patent Document 2) discloses a wire electric discharge machining for correcting a machining route when a corner is detected in the machining route, such that the wire electrode moves on a machining route extended by a specified distance in the advancing direction, then moves along the original machining route for a specified distance, and then gradually returns to the original machining route.

Since there are a great variety of machining types performed by a wire electric discharge machine, a great amount of experiments and verifications are required to set up various parameters to appropriately control these types of machining. Even if the sizes or angles of the corners are identical, appropriate machining could not be achieved if the amounts of correction are not changed depending on the machining environment such as the presence or absence of disturbances or other influences. The prior art methods, therefore, cannot always achieve machining results as intended by the worker.

In the technique disclosed by the aforementioned Patent Document 1, the amounts of deflection of wire electrode are stored in the storage unit and the machining route is corrected by positioning the wire electrode using these amounts of deflection as the amounts of correction, thereby relieving the worker of the aforementioned burden of modifying the machining program. This technique, however, has several problems yet to be solved.

One of the problems is that the worker cannot set the amounts of correction as desired because the amounts of correction are automatically determined from the amounts of deflection of the wire electrode stored in the storage unit. In wire electric discharge machines, electrical machining conditions are determined according to the thickness and material of the workpiece, as well as the thickness and material of the wire electrode, and numerous machining conditions are stored in the controller. To determine the amounts of deflection of the wire electrode, the influences of the machining conditions must be taken into account. At the same time, disturbances and influences from the machining environment cannot be ignored, including changes in flow of the machining liquid due to differences in shape of the corners, i.e., inside corners or outside corners, the angles of the corners, the change in thickness of the workpiece, and interference with a jig.

In Patent Document 1, when the amount of deflection under predetermined machining conditions has not been stored, the corresponding amount of deflection is determined by performing test machining according to a control program.

In this way, the amount of deflection can be set by taking into account the influences of machining conditions. However, since the aforementioned disturbances and influences from the machining environment are not taken into account, machining cannot always be achieved as intended by the worker. In other words, this technique cannot address the influences and the amounts of correction cannot be changed when the machining environment varies even if the sizes and angles of the corners are identical.

Figure 10:
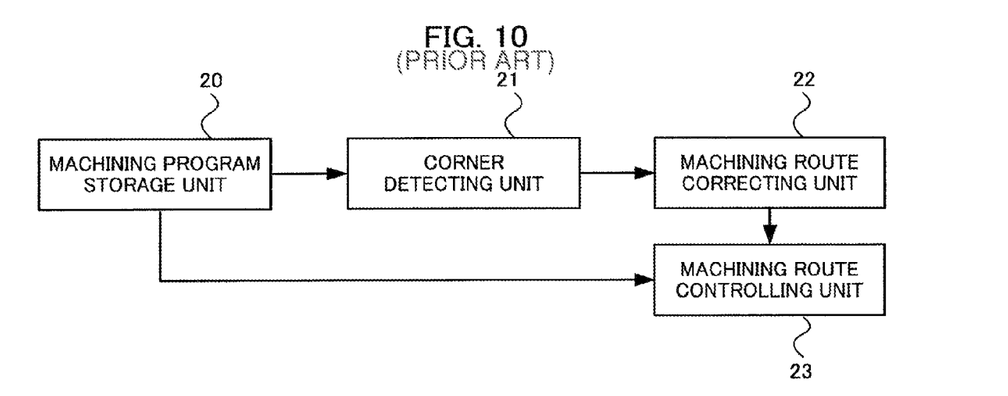
FIG. 10 is a block diagram of a conventional wire electric discharge machine controller having a machining route correcting unit.

The technique disclosed by Patent Document 2 is schematically shown in FIG. 10. As shown in FIG. 10, a machining program is stored in a machining program storage unit 20. A corner detecting unit 21 detects corners in the machining routes identified from the machining program. When the corner detecting unit 21 detects a corner in the machining route, a machining route correcting unit 22 corrects the machining route at the corner such that the wire electrode deviates from the original machining route at the corner by a predetermined distance in the advancing direction, then moves along the next machining route for a predetermined distance from the corner, and gradually returns to the original machining route, and outputs the machining route thus corrected to a machining route controlling unit. On the basis of the machining route received from the machining route correcting unit 22, the machining route controlling unit 23 moves the wire electrode with respect to the workpiece.

As shown in FIG. 10, the technique disclosed by Patent Document 2 detects corners in the machining route using a corner detecting unit 21 and automatically corrects the machining route by predetermined distances set in parameters. These parameters are set by distinguishing inside corner from outside corner and/or on the basis of the angles of the corners, etc. Since a great amount of time and effort is required to prepare various patterns of parameters for different machining conditions, several typical parameters are prepared in practice and the parameters seemed closest to the machining situation are selected. Consequently, machining cannot always be achieved as intended by the worker.

SUMMARY OF THE INVENTION

One object of the present invention is to provide a wire electric discharge machine controller capable of correcting a machining route using commands from a machining program such that intentions of the worker can be reflected precisely on the machining result.

The present invention relates to a wire electric discharge machine controller for correcting a machining route using program commands. The controller creates a machining route on the basis of a machining program including a plurality of machining blocks and moving a wire electrode with respect of a workpiece, following the created machining route while machining. The controller includes: a machining program storage unit that has stored therein a machining program in which a machining route correction command for correcting a machining route at a corner formed by two consecutive machining blocks, including a machining block to be machined first and a machining block to be machined next, is described, wherein an extension distance of the machining block to be machined first and a removal distance of the machining block to be machined next are specified in the machining route correction command, whereby the machining route is corrected in a manner such that the end point of the machining block to be machined first, an extension point obtained by extending the machining block from the end point thereof in the machining advancing direction by the extension distance, and a new start point obtained by partially removing the machining block to be machined next by the removal distance from the start point of the next machining block are connected; a machining program analyzing unit for analyzing the machining program, and reading out the extension distance by which a machining block for which the machining route correction command is issued is extended from the end point of the machining block in the machining advancing direction and the removal distance by which the machining block next to the machining block is partially removed from the start point of the machining block; a machining route correcting unit for correcting the machining route in a manner such that the end point of the machining block to be machined first, the extension point obtained by extending the machining block from the end point by the extension distance read by the machining program analyzing unit, and the new start point obtained by partially removing the machining block to be machined next by the removal distance read by the machining program analyzing unit are connected; and a machining route controlling unit for moving the wire electrode with respect to the workpiece on the basis of the corrected machining route.

The present invention can provide a wire electric discharge machine controller capable of correcting the machining route using commands from a machining program such that intentions of the worker can be reflected on the machining result.

BRIEF DESCRIPTION OF THE DRAWINGS

The above and other objects and features of the present invention will be apparent from the following description of an embodiment with reference to the appended drawings, in which.

DETAILED DESCRIPTION OF THE PREFERRED EMBODIMENTS

The present invention corrects the machining route using machining program commands such that intentions of the worker are reflected on the correction of the machining route. Suppose machining as in FIG. 1, for example. The uncorrected machining program in FIG. 2 has machining blocks including X and Y axis movement commands for machining a workpiece to a shape of 10×10 mm.

Figure 1:
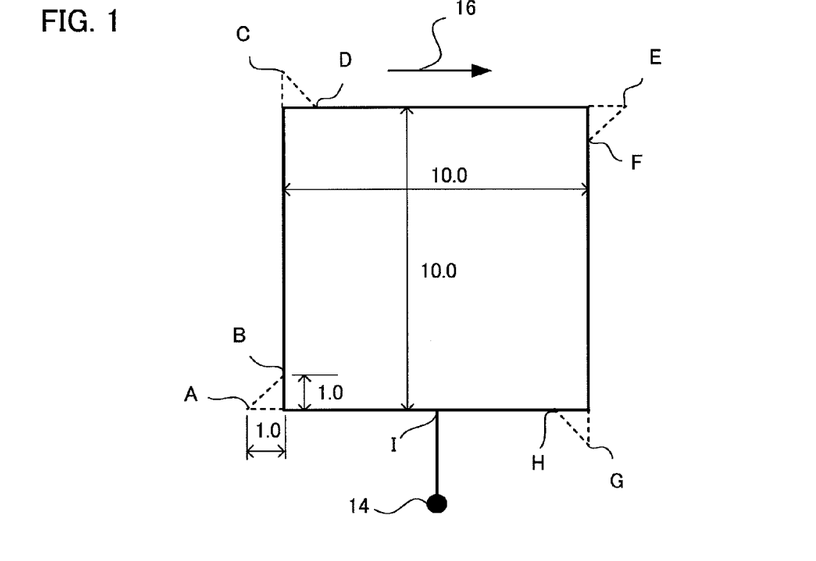
FIG. 1 illustrates an example of a wire electric discharge machining method performed by using a wire electric discharge machine controller according to the present invention.
Figure 2:
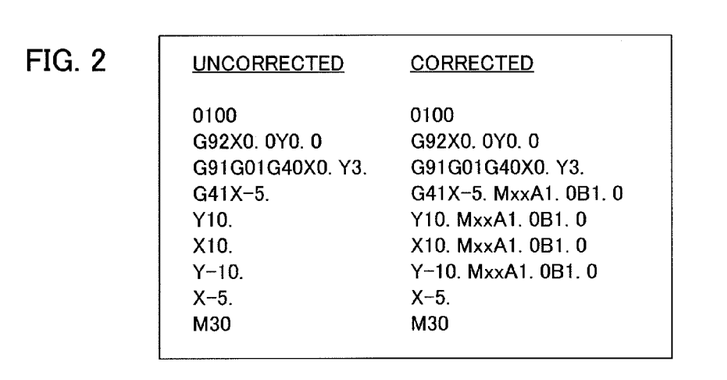
FIG. 2 illustrates how a machining program is modified for wire electric discharge machining using the wire electric discharge machine controller according to the present invention.

The program for machining a workpiece 2 to a shape indicated by the solid line in FIG. 1 is described as the "uncorrected" machining program in FIG. 2.

The "uncorrected" machining program in FIG. 2 will now be described block by block. Here, the unit is mm. O100 is a program number.

[G92X0.0Y0.0] G92 is a G code indicating the origin point of the coordinate system. This block specifies X0.0, Y0.0 as the origin point of the coordinate system.

[G91G01G40X0.Y3.] G91 is a G code indicating an increment command, specifying that the data input in this and following blocks are increment data. G01 is a G code indicating linear interpolation. G40 is a G code for cancelling tool correction. This block specifies linear interpolation for an increment of X0.0, Y3.0.

[G41X-5.] G41 is a G code indicating tool diameter correction to the left in the advancing direction. This block specifies tool diameter correction and linear interpolation for an increment of X-5.0.

[Y10.] This block specifies linear interpolation for an increment of Y10.0.

[X10.] This block specifies linear interpolation for an increment of X10.0.

[Y-10.] This block specifies linear interpolation for an increment of Y-10.0.

[X-5.] This block specifies linear interpolation for an increment of X-5.0.

[M30] This block specifies the end of program.

On the other hand, in the "corrected" machining program, "MxxAaaBbb" is appended to the machining blocks to be corrected as shown in FIG. 2 and the machining route is thereby corrected as indicated by the dashed lines in FIG. 1. More specifically, "Mxx" is a machining route correction command for correcting the machining route. "Aaa" indicates an extension distance (here 1.0 mm) by which a machining block for which machining route correction command is issued is extended from the end point thereof in the machining advancing direction. "Bbb" indicates a removal distance (here 1.0 mm) by which the next machining block is partially removed from the start point of the next machining block. The aforementioned extension distance is described in "aa" and the removal distance is described in "bb". The point obtained by extending the current machining block in the machining advancing direction by a predetermined distance from the end point of the current machining block will be hereinafter referred to as the "extension point" and the point obtained by partially removing the next machining block will be referred to as the "new start point". The predetermined distance by which a machining block is extended from the end point thereof and the predetermined distance by which a machining block is partially removed can be set as desired.

With these machining route correction commands, the machining route can be corrected without altering the original movement commands (machined shape) in the machining program. Consequently, even if the shape to be machined is complicated, the worker can easily correct the machining route as desired and thus easily achieve machining as intended.

The "corrected" machining program in FIG. 2 will now be described block by block. Here, the unit is mm. O100 is a program number.

[G92X0.0Y0.0] G92 is a G code indicating the origin point of the coordinate system. This block specifies X0.0, Y0.0 as the origin point of the coordinate system.

[G91G01G40X0.Y3.] G91 is a G code indicating an increment command, specifying that the data input in this and following blocks are increment data. G01 is a G code indicating linear interpolation. G40 is a G code for cancelling tool correction. This block specifies linear interpolation for an increment of X0.0, Y3.0.

[G41X-5.MxxA1.0B1.0] G41 is a G code indicating tool diameter correction to the left in the advancing direction. This block specifies tool diameter correction and linear interpolation for an increment of X-5.0. Mxx is a machining route correction command for correcting the machining route. A1.0 indicates a distance (here 1.0 mm) by which a machining block for which machining route correction command is issued is extended from the end point thereof in the machining advancing direction. B10 indicates a distance (here 1.0 mm) by which the next machining block is partially removed from the start point of the next machining block.

[Y10.MxxA1.0B1.0] This block specifies linear interpolation for an increment of Y10.0. Mxx is a machining route correction command for correcting the machining route. A1.0 indicates a distance (here 1.0 mm) by which a machining block for which machining route correction command is issued is extended from the end point thereof in the machining advancing direction. B10 indicates a distance (here 1.0 mm) by which the next machining block is partially removed from the start point of the next machining block.

[X10.MxxA1.0B1.0] This block specifies linear interpolation for an increment of X10.0. Mxx is a machining route correction command for correcting the machining route. A1.0 indicates a distance (here 1.0 mm) by which a machining block for which machining route correction command is issued is extended from the end point thereof in the machining advancing direction. B10 indicates a distance (here 1.0 mm) by which the next machining block is partially removed from the start point of the next machining block.

[Y-10.MxxA1.0B1.0] This block specifies linear interpolation for an increment of Y-10.0. Mxx is a machining route correction command for correcting the machining route. A1.0 indicates a distance (here 1.0 mm) by which a machining block for which machining route correction command is issued is extended from the end point thereof in the machining advancing direction. B10 indicates a distance (here 1.0 mm) by which the next machining block is partially removed from the start point of the next machining block.

[X-5.] This block specifies linear interpolation for an increment of X-5.0.

[M30] This block specifies the end of the program.

This example shows a case in which the amounts of correction are identical at all the four corners of 90 degrees. Even if there are corners affected by disturbances or variations in the machining environment, the amounts of correction can be changed by setting the extension distance A and/or the removal distance B to any value and thereby intentions of the worker can easily be reflected on machining.

Although this example shows a case for correcting the machining route at so-called outside corners, it is apparent that similar corrections are applicable to inside corners to reduce the degradation in accuracy of the machined shape due to a deflection of a wire electrode. Although in the foregoing the corner is formed by two straight blocks, it is apparent that similar effects can be achieved at corners formed by a straight block and an arcuate block or corners formed by two arcuate blocks.

The wire electric discharge machine controller according to the present invention will now be described with reference to the block diagram in FIG. 3.

A machining program analyzing unit 31 analyzes a machining program stored in a machining program storage unit 30, determines whether or not a machining route correction command is issued. If it is determined that the machining route correction command is issued, the machining program analyzing unit 31 sends the machining route correction command, together with the 'distance A to be extended' and the 'distance B to be removed', to the machining route correcting unit 32. Receiving the machining route correction command from the machining program analyzing unit 31, the machining route correcting unit 32 corrects the machining route such that the current machining block is connected to the next machining block by displacing the end point of the current machining block by the 'distance to be extended' in the machining advancing direction and then partially removing the next machining block by the 'distance to be removed' from the start point of the next machining block, thereby outputting the corrected machining route to a machining route controlling unit 33. The machining route controlling unit 33 moves the wire electrode with respect to the workpiece, following the corrected machining route input by the machining route correcting unit 32.

Figure 3:
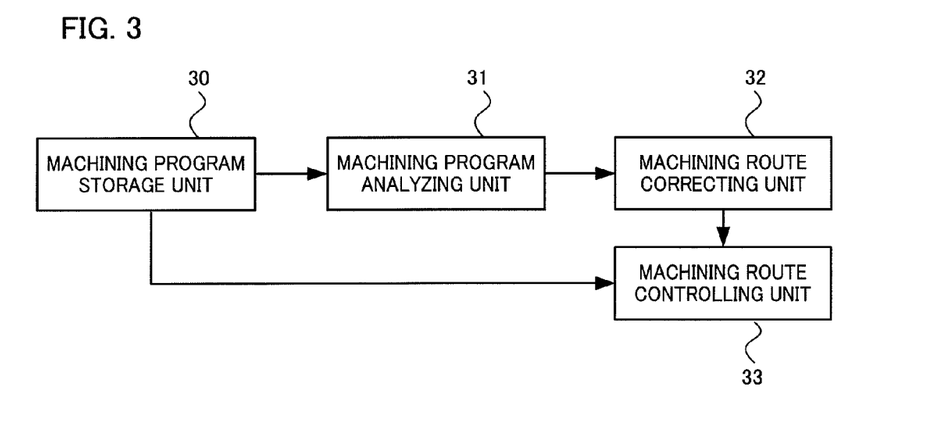
FIG. 3 is a block diagram of the wire electric discharge machine controller according to the present invention having a machining route correcting unit.

The wire electric discharge machine controller according to the present invention, which has the configuration shown in the block diagram in FIG. 3, creates a machining route on the basis of a machining program including a plurality of machining blocks and moves the wire electrode with respect to the workpiece, following the created machining route while machining.

The machining route is corrected such that the end point of the "machining block to be machined first", the extension point obtained by extending the current machining block in the machining advancing direction by a predetermined distance from the end point of the current machining block, and the new start point obtained by partially removing the "machining block to be machined next" by the predetermined distance from the start point of the next machining block are connected, the "machining block to be machined first" and the "machining block to be machined next" being two consecutive machining blocks which forms a corner. To this end, the machining program storage unit 30 stores a machining program that describes machining route correction commands indicating the extended distance of the "machining block to be machined first" and the removal distance of the "machining block to be machined next".

The machining program analyzing unit 31 analyzes the machining program stored in the machining program storage unit 30 and reads out the extension distance by which a machining block for which machining route correction command is issued is extended from the end point of the machining block and the removal distance by which the next machining block is partially removed from the start point of the next machining block.

The machining route correcting unit 32 corrects the machining route such that the end point of the "machining block to be machined first", the extension point obtained by extending the machining block from the end point thereof in the machining advancing direction by the extension distance, read by the machining program analyzing unit 31, and the new start point obtained by partially removing the "machining block to be machined next" by the removal distance, read by the machining program analyzing unit 31, from the start point of the "machining block to be machined next".

The machining route controlling unit 33 moves the wire electrode with respect to the workpiece, following the machining route corrected by the machining route correcting unit 32.

Figure 4:
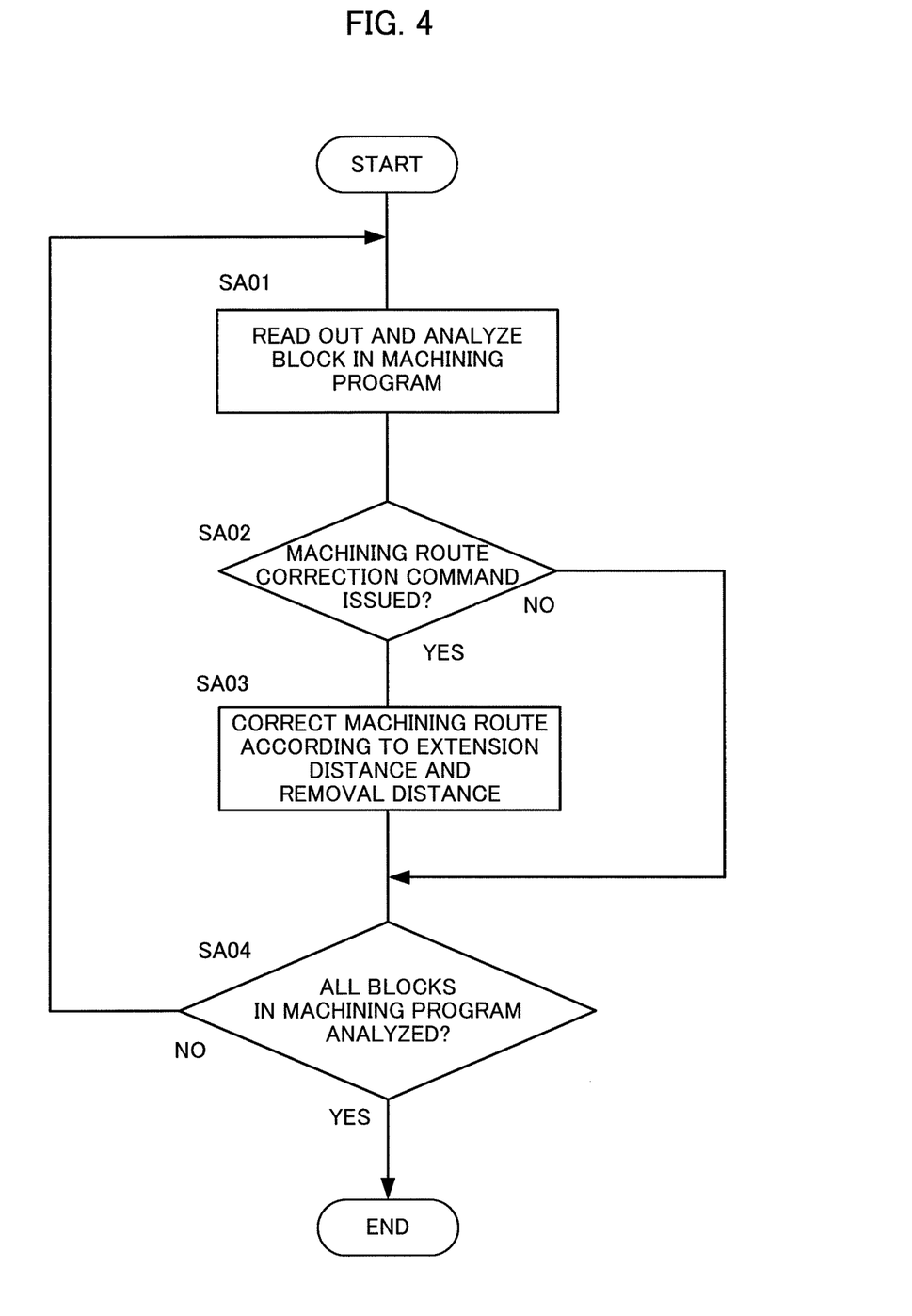
FIG. 4 is a flowchart illustrating a machining route correction process by the controller shown in FIG. 3.

A machining route correction process executed by the controller shown in FIG. 3 will now be described with reference to the flowchart in FIG. 4. Description will be given in the order of steps.

[Step SA01] A block in the machining program is read out and analyzed.

[Step SA02] Decision is made whether or not a machining route correction command is issued; if issued, the process proceeds to Step SA03; if not issued, the process proceeds to Step SA04.

[Step SA03] The machining route is corrected according to the extension distance of the "machining block to be machined first" and the removal distance of the "machining block to be machined next".

[Step SA04] Decision is made whether or not all the blocks in the machining program have been analyzed; if all the blocks have been analyzed, the process ends; if all the blocks have not been analyzed, the process returns to Step SA01 to continue processing.

As described above, the present invention can provide a wire electric discharge machine controller capable of correcting the machining route using commands from the machining program such that intentions of the worker can be reflected on the machining result.

Effects of the present invention prevailing over the prior art techniques will be described supplementary by comparing the present invention with the techniques disclosed by the prior art documents.

According to the technique disclosed by the aforementioned Patent Document 1 (Japanese Patent Application Laid-Open No. 61-219529), the machining route on which the wire electrode is moved is substantially the same as the machining route that has been corrected using the controller of the present invention. Patent Document 1 has adopted the control method that stores the amounts of wire deflection and successively corrects the machining route on the basis of the stored amounts of wire deflection while machining is in progress. On the other hand, the present invention corrects the machining route on the basis of specific program commands for correcting the machining route. The present invention can therefore reflect intentions of the worker precisely on the machining result, while such an effect cannot be achieved by the technique of Patent Document 1.

According to the technique disclosed by the aforementioned Patent Document 2 (Japanese Patent Application Laid-Open No. 7-24645), the machining route is corrected by automatically detecting corners in the machining route. On the other hand, the present invention corrects the machining route on the basis of specific program commands for correcting the machining route, instead of correcting the machining route by detecting corners in the machining route. After passing through a corner, the wire electrode does not move along the original machining route. The present invention can therefore reflect intentions of the worker precisely on the machining result, while such an effect cannot be achieved by the technique of Patent Document 2.

The invention claimed is:

1. A wire electric discharge machine controller for correcting a machining route using program commands by creating a machining route on the basis of a machining program including a plurality of machining blocks and moving a wire electrode with respect of a workpiece, following the created machining route while machining, the controller comprising:
a machining program storage unit that has stored therein a machining program in which a machining route correction command for correcting a machining route at a corner formed by two consecutive machining blocks, including a machining block to be machined first and a machining block to be machined next, is described, wherein an extension distance of the machining block to be machined first and a removal distance of the machining block to be machined next are specified in the machining route correction command, whereby the machining route is corrected in a manner such that the end point of the machining block to be machined first, an extension point obtained by extending the machining block from the end point thereof in a machining advancing direction by the extension distance, and a new start point obtained by partially removing the machining block to be machined next by said removal distance from the start point of said next machining block are connected;

a machining program analyzing unit for analyzing the machining program, and reading out said extension distance by which a machining block for which the machining route correction command is issued is extended from the end point of the machining block in the machining advancing direction and said removal distance by which the machining block next to said machining block is partially removed from the start point of the machining block;

a machining route correcting unit for correcting the machining route in a manner such that the end point of the machining block to be machined first, the extension point obtained by extending said machining block from said end point by the extension distance read by the machining program analyzing unit, and the new start point obtained by partially removing the machining block to be machined next by the removal distance read by the machining program analyzing unit are connected; and a machining route controlling unit for moving the wire electrode with respect to the workpiece on the basis of the corrected machining route, wherein the extension point is obtained by linearly extending the machining block from the end point thereof in the machining advancing direction by the extension distance.

\* \* \* \* \*